United States Patent
Avasthi et al.

(10) Patent No.: US 10,757,246 B2
(45) Date of Patent: Aug. 25, 2020

(54) METHOD AND APPARATUS FOR PERFORMING AT LEAST ONE OPERATION BASED ON DEVICES CONTEXT

(71) Applicant: Samsung Electronics Co., Ltd., Suwon-si, Gyeonggi-do (KR)

(72) Inventors: Prakhar Avasthi, Noida (IN); Ranjesh Verma, Noida (IN); Sumit Kumar Tiwary, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/969,415

(22) Filed: May 2, 2018

(65) Prior Publication Data
US 2018/0332164 A1   Nov. 15, 2018

(30) Foreign Application Priority Data
May 9, 2017   (IN) .............................. 201741016333

(51) Int. Cl.
*H04W 4/02*       (2018.01)
*H04M 1/725*    (2006.01)
(Continued)

(52) U.S. Cl.
CPC ..... *H04M 1/72569* (2013.01); *H04M 1/7253* (2013.01); *H04M 1/72558* (2013.01);
(Continued)

(58) Field of Classification Search
CPC ........... H04M 1/72569; H04M 1/7253; H04M 1/72558; H04M 2250/12; H04W 4/023; H04W 68/005; G06F 3/017; G06F 1/3265; G06F 3/0346; G06F 1/163; G06F 3/04886; Y02D 10/153

See application file for complete search history.

(56) References Cited

U.S. PATENT DOCUMENTS

| 9,696,815 B2 * | 7/2017 | Hwang ................... G06F 3/017 |
| 10,019,067 B2 * | 7/2018 | Yoon ....................... G06F 3/017 |

(Continued)

FOREIGN PATENT DOCUMENTS

| EP | 3 010 212 A1 | 4/2016 |
| WO | 2016-077035 A1 | 5/2016 |

OTHER PUBLICATIONS

European Search Report dated Nov. 13, 2019, issued in European Patent Application No. 18798426.5.

*Primary Examiner* — Pablo N Tran
(74) *Attorney, Agent, or Firm* — Jefferson IP Law, LLP

(57) ABSTRACT

A method for performing at least one operation based on devices context is provided. The method includes detecting, by a first electronic device, a first input data. Further, the method includes receiving, by the first electronic device, a second input data from a second electronic device. Further, the method includes determining, by the first electronic device, a devices context based on the first input data and the second input data. Furthermore, the method includes performing, by the first electronic device, the at least one operation based on the determined devices context. In an embodiment of the disclosure, the devices context is a same hand context. In an embodiment of the disclosure, the devices context is a different hand context.

25 Claims, 14 Drawing Sheets

(51) Int. Cl.
 *G06F 3/01* (2006.01)
 *H04W 68/00* (2009.01)
(52) U.S. Cl.
 CPC ......... *H04W 4/023* (2013.01); *H04W 68/005* (2013.01); *H04M 2250/12* (2013.01)

(56) References Cited

U.S. PATENT DOCUMENTS

| | | |
|---|---|---|
| 2015/0022438 A1 | 1/2015 | Hong |
| 2015/0031333 A1 | 1/2015 | Lee |
| 2016/0085329 A1 | 3/2016 | Yim et al. |
| 2016/0098091 A1 | 4/2016 | Hwang |
| 2016/0110012 A1* | 4/2016 | Yim ..................... G06F 1/1626 345/173 |
| 2016/0198322 A1 | 7/2016 | Pitis |
| 2016/0262116 A1 | 9/2016 | Ying et al. |
| 2016/0277891 A1 | 9/2016 | Dvortsov et al. |
| 2017/0010674 A1 | 1/2017 | Ide |

\* cited by examiner

METHOD AND APPARATUS FOR PERFORMING AT LEAST ONE OPERATION BASED ON DEVICES CONTEXT

CROSS-REFERENCE TO RELATED APPLICATION(S)

This application is based on and claims priority under 35 U.S.C. § 119(a) of an Indian patent application number 201741016333, filed on May 9, 2017, in the Indian Intellectual Property Office, the disclosure of which is incorporated by reference herein in its entirety.

BACKGROUND

1. Field

The disclosure relates to an electronic device. More particularly, the disclosure relates to a method and an apparatus for performing at least one operation based on a devices context.

2. Description of Related Art

A wearable device using a wireless technology is configured to maintain a wireless communication connection with an electronic device (e.g., a smart phone, or the like) either through establishing the connection on-demand or establishing an always-on connection. But, the simultaneous operation between the wearable device and the electronic device may not be possible in certain scenarios like below.

In an example, assume that the user holds and operates the smart watch and smart phone in same hand. If the user receives an incoming call then the incoming call restricts the use of smart watch. In another example, assume that the user holds and operates the smart watch and smart phone in same hand. If the smart watch receives a notification message, then the notification event may cause the user to switch the smart phone from one hand to another hand unnecessarily for a short duration.

Thus, it is desired to address the above-mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for performing at least one operation based on a devices context.

Another aspect of the disclosure is to compare a first input data with a second input data.

Another aspect of the disclosure is to detect whether motion data of a first electronic device and a second electronic device is one of similar and different based on the comparison of the first input data and the second input data.

Another aspect of the disclosure is to determine, by the first electronic device, the devices context based on the first input data and the second input data.

Another aspect of the disclosure is to determine the devices context as the same hand context in response to detect that the motion data of the first electronic device and the second electronic device is similar.

Another aspect of the disclosure is to determine similarity between the motion data of the first electronic device and the second electronic device based on motion threshold criteria.

Another aspect of the disclosure is to determine the devices context as the different hand context based on detecting that the motion data of the first electronic device and the second electronic device is different.

Another aspect of the disclosure is to detect whether a proximity between the first electronic device and the second electronic device is within a proximity threshold criteria based on a result of the comparison of the first input data with the second input data.

Another aspect of the disclosure is to detect, by the first electronic device, a hand switch event.

Another aspect of the disclosure is to update, by the first electronic device, the determined devices context based on the hand switch event.

Another aspect of the disclosure is to perform at least one operation based on the determined devices context.

Additional aspects will be set forth in part in the description which follows and, in part, will be apparent from the description, or may be learned by practice of the presented embodiments.

In accordance with another aspect of the disclosure, a method for performing at least one operation based on a devices context is provided. The method includes detecting, by a first electronic device, a first input data. Further, the method includes receiving, by the first electronic device, a second input data from a second electronic device. Further, the method includes determining, by the first electronic device, the devices context based on the first input data and the second input data. Furthermore, the method includes performing, by the first electronic device, at least one operation based on the determined devices context. In an embodiment of the disclosure, the devices context is a same hand context. In an embodiment of the disclosure, the devices context is a different hand context.

In accordance with another aspect of the disclosure, a method is provided. The method includes detecting, by the first electronic device, a hand switch event. Further, the method includes updating, by the first electronic device, the determined devices context based on the hand switch event.

In an embodiment of the disclosure, the devices context is determined by comparing the first input data with the second input data, detecting whether motion data of the first electronic device and the second electronic device is one of similar and different based on a result of the comparison, and determining one of the devices context as the same hand context in response to detecting that the motion data of the first electronic device and the second electronic device is similar, and the devices context as the different hand context in response to detecting that the motion data of the first electronic device and the second electronic device is different.

In an embodiment of the disclosure, similarity between the motion data of the first electronic device and the second electronic device is determined based on motion threshold criteria.

In an embodiment of the disclosure, the motion threshold criteria comprises a range comprising an upper limit and lower limit dynamically determined based on one of the motion data of the first electronic device and the motion data of the second electronic device.

In an embodiment of the disclosure, the devices context is determined by comparing the first input data with the second input data, detecting whether a proximity between the first electronic device and the second electronic device is within a proximity threshold criteria based on a result of the comparison, detecting whether motion data of the first electronic device and the second electronic device is one of similar and different based on a result of the comparison in response to determining that the proximity between the first electronic device and the second electronic device is within the threshold criteria, and determining one of the devices context as the same hand context in response to detecting that the motion data of the first electronic device and the second electronic device is similar, and the devices context as the different hand context in response to detecting that the motion data of the first electronic device and the second electronic device is different.

In an embodiment of the disclosure, the proximity threshold criteria comprises a range includes an upper limit and lower limit dynamically determined based on one of the input data of the first electronic device and the input data of the second electronic device.

In an embodiment of the disclosure, the motion data of the first electronic device and the second electronic device is substantially same or same determined based on the motion threshold criteria.

In an embodiment of the disclosure, the same hand context indicates that the first electronic device and the second electronic device are used by a same hand of a user.

In an embodiment of the disclosure, the different hand context indicates that the first electronic device and the second electronic device are not used by a same hand of a user.

In an embodiment of the disclosure, the operation corresponds to send, by the first electronic device, a request to regulate a playback rate of a media file to the second electronic device.

In an embodiment of the disclosure, the operation corresponds to regulate a playback rate of a media file to the first electronic device.

In an embodiment of the disclosure, the operation corresponds to send, by the first electronic device, a request to the second electronic device to enable an input over screen off.

In an embodiment of the disclosure, the operation corresponds to enable, by the first electronic device, an input dispatcher over a screen off.

In an embodiment of the disclosure, the operation corresponds to receive an input at the first electronic device and map the received input to the second electronic device.

In an embodiment of the disclosure, the operation corresponds to send a notification received at the first electronic device to the second electronic device.

In an embodiment of the disclosure, the operation corresponds to send, by the first electronic device, a request to the second electronic device to switch a navigation from an audio mode to a haptic feedback mode.

In an embodiment of the disclosure, the operation corresponds to switch, by the first electronic device, a navigation from an audio mode to a haptic feedback mode.

In an embodiment of the disclosure, the operation corresponds to send, by the first electronic device, a request to provide access to a private memory at the second electronic device.

In an embodiment of the disclosure, the operation corresponds to provide, by the first electronic device, an access to a private memory.

In an embodiment of the disclosure, the first input data includes motion information of the first electronic device.

In an embodiment of the disclosure, the first input data includes proximity information of the second electronic device.

In an embodiment of the disclosure, the first input data includes combination of motion information of the first electronic device and proximity information of the second electronic device.

In an embodiment of the disclosure, the second input data includes motion information of the second electronic device.

In an embodiment of the disclosure, the second input data includes proximity information of the first electronic device.

In an embodiment of the disclosure, the second input data includes combination of motion information of the second electronic device and proximity information of the first electronic device.

In an embodiment of the disclosure, the motion information of the first electronic device and the motion information of the second electronic device are measured at a same time period.

In accordance with another aspect of the disclosure, an electronic device for performing at least one operation based on a devices context is provided. The electronic device includes an input detector configured to detect a first input data and receive a second input data from another electronic device. A context detector is configured to determine a devices context based on the first input data and the second input data. The devices context is one of a same hand context and a different hand context. At least one processor is configured to perform the at least one operation based on the determined devices context.

In accordance with another aspect of the disclosure, a system for performing at least one operation based on a devices context is provided. The system includes a first electronic device and a second electronic device communicated with the first electronic device. The first electronic device is configured to detect a first input data and receive a second input data from the second electronic device. Further, the first electronic device is configured to determine a devices context based on the first input data and the second input data. The devices context is one of a same hand context and a different hand context. Further, the first electronic device is configured to perform the at least one operation based on the determined devices context.

In accordance with another aspect of the disclosure, a computer program product is provided. The computer program product includes a computer executable program code recorded on a computer readable non-transitory storage medium. The computer executable program code when executed causing the actions includes detecting, by a first electronic device, a first input data. The computer executable program code when executed causing the actions includes receiving, by the first electronic device, a second input data from a second electronic device. The computer executable program code when executed causing the actions includes determining, by the first electronic device, the devices context based on the first input data and the second input data, wherein the devices context is one of a same hand context and a different hand context. The computer executable program code when executed causing the actions includes causing, by the first electronic device, to perform at least one operation based on the determined devices context.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be apparent from the following description taken in conjunction with accompanying drawings, in which.

Throughout the drawings, like reference numerals will be understood to refer to like parts, components, and structures.

DETAILED DESCRIPTION

Figure 1A:
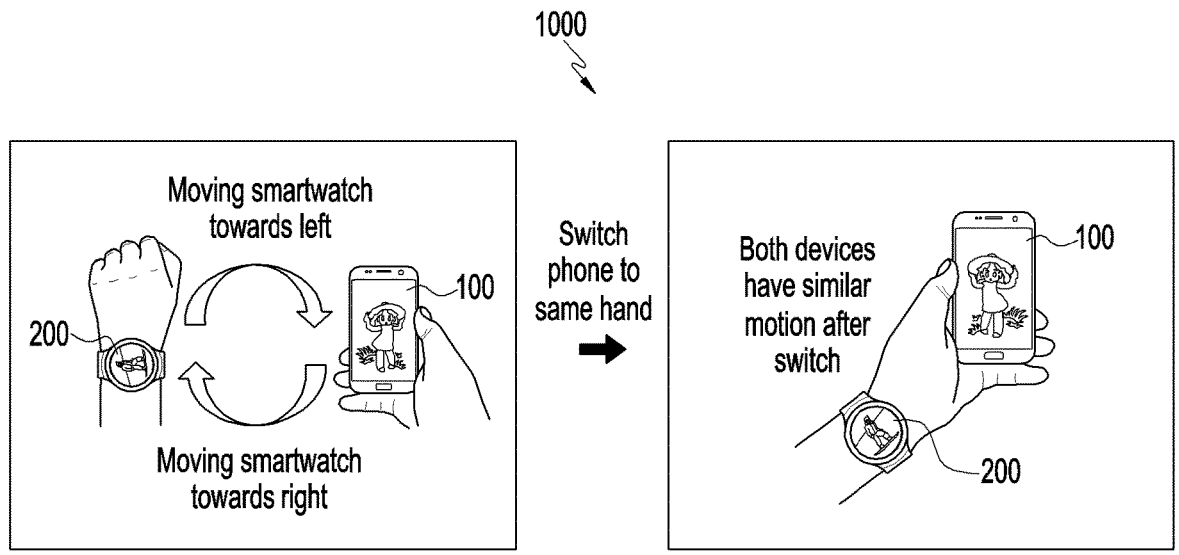
FIGS. 1A and 1B illustrate an overview of a system for managing an operation based on a devices context according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In addition, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules, or the like, are physically implemented by analog or digital circuits, such as logic gates, integrated circuits, microprocessors, microcontrollers, memory circuits, passive electronic components, active electronic components, optical components, hardwired circuits, and the like, and may optionally be driven by firmware and software. The circuits may, for example, be embodied in one or more semiconductor chips, or on substrate supports, such as printed circuit boards, and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, and the like, may be used herein to describe various elements, these elements should not be limited by these terms. These terms are generally only used to distinguish one element from another.

The embodiments herein disclose a method for managing operations based on devices context. The method includes detecting, by a first electronic device, a first input data. Further, the method includes receiving, by the first electronic device, a second input data from a second electronic device. Further, the method includes determining, by the first electronic device, the devices context based on the first input data and the second input data. In an embodiment of the disclosure, the devices context is a same hand context. In an embodiment of the disclosure, the devices context is a different hand context. Furthermore, the method includes causing, by the first electronic device, to perform an operation based on the determined devices context.

Unlike the systems and methods of the related art, the proposed method can be used to set up the context based on that the first electronic device (e.g., a smart phone) and the second electronic device (e.g., a smart watch) are in same hand or different hands based on a motion comparison and a Bluetooth proximity comparison. Based on the motion comparison and the Bluetooth proximity comparison, the proposed method can be used to define interactions between the first and second electronic devices.

The proposed method can be used to determine relative states of the first electronic device (i.e., a smart phone) with the second electronic device (e.g., a wearable device) to determine priority of the first and second devices for an event (e.g., an incoming call, a notification event, a message service, or the like). The proposed method can be used to automatically provide an input over the first and second electronic devices along with motion of the first and second electronic devices for decision making.

The proposed method can be used to provide the devices contextual based operation based on the user holding the first electronic device and the second electronic device on same hand or different hands. This resulting in providing a seamless experience of using both first electronic device and second electronic device together.

The proposed method can be used to allow the user to define priority of the first electronic device and the second electronic device based on the first and second electronic device's display currently relevant to the user.

The proposed method can intuitively change the behavior of the first electronic device and the second electronic device based on the first and second electronic device's display which is relevant for the user at a particular instance of time. In an example, the user is attending call over a smart phone while wearing the smart watch in other hand and at the same time, the user wants to provide an input to the smart watch for performing some operation. The proposed method allows the user to perform the operation based on the first and second electronic device's display which is relevant for the user at the particular instance of time.

Further, the proposed method allows the user to define priorities of various events based on the current context of the first electronic device and the second electronic device by determining the display unit associated with one of the first electronic device and the second electronic device best suitable for the user. This way user can be able to perform operations on multiple devices with the least amount of effort.

Further, the proposed method can be used to define the context when the first electronic device and the second electronic device are used on the same hand or the first electronic device and the second electronic device are used on different hands. The context can be associated using comparison of motion of the first electronic device and the second electronic device and corresponding detection of switching of hand operation.

The proposed method doesn't need any user initiated special gesture to determine control function. Further, the proposed method can be used to automatically determine whether the first electronic device and the second electronic device are in same arm or the different arms based on proximity detection using a wireless media like a bluetooth low energy (BLE) whisper mode or a motion comparison function. The proposed method intuitively determines priority of the first electronic device and the second electronic device based on relative positioning and then apply control function based on running applications on either first electronic device or the second electronic device.

Referring now to the drawings and more particularly to FIGS. 1A through 15, where similar reference characters denote corresponding features consistently throughout the figure, these are shown preferred embodiments.

Figure 1B:
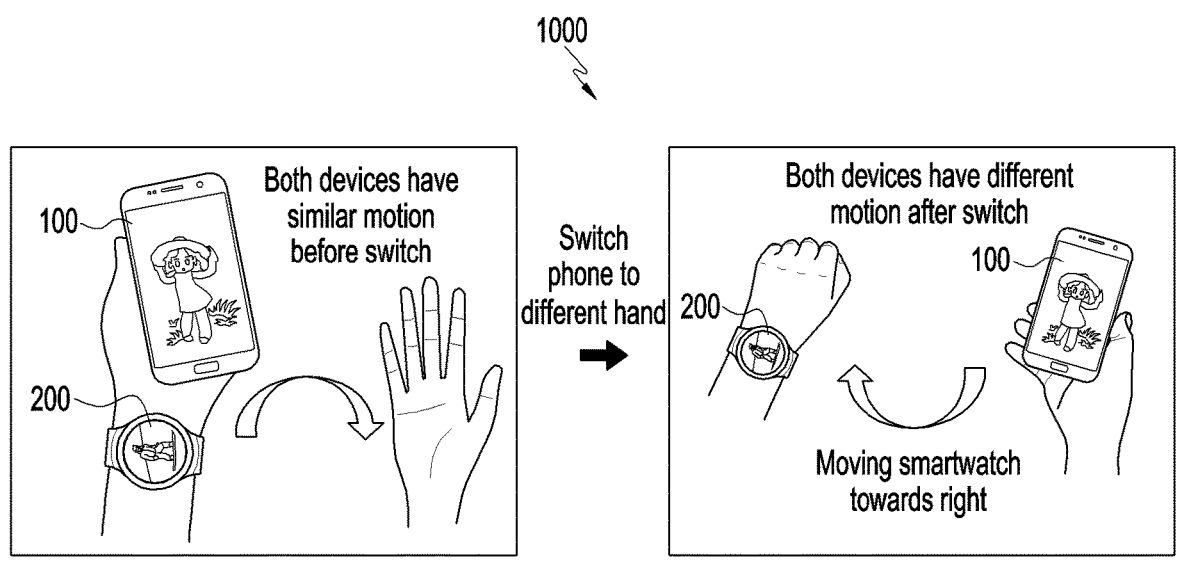

FIGS. 1A and 1B illustrate an overview of a system for managing an operation based on devices context, according to an embodiment of the disclosure.

Referring to FIGS. 1A and 1B, in an embodiment of the disclosure, a system 1000 includes a first electronic device 100 and a second electronic device 200. The first electronic device 100 can be, for example but not limited to, a mobile phone, a smart phone, a laptop computer, an electronic book terminal, a personal digital assistant, a portable multimedia player (PMP), or the like. The second electronic device 200 can be, for example but not limited to, a wearable device (e.g., a smart watch, a smart band, a smart ring, or the like). In an embodiment of the disclosure, the devices context is a same hand context. In an embodiment of the disclosure, the devices context is a different hand context.

The first electronic device 100 is configured to detect a first input data and receive a second input data from the second electronic device 200. In an embodiment of the disclosure, the first input data is detected based on user gesture (e.g., a swipe gesture, a hand motion gesture, a tap event, a double tap event, a long press event, or the like). Further, the first electronic device 100 is configured to compare the first input data with the second input data. Based on the comparison of the first input data and the second input data, the first electronic device 100 is configured to detect whether motion data of the first electronic device 100 and the second electronic device 200 is one of same hand and different hands.

In an embodiment of the disclosure, the first electronic device 100 is configured to determine one of the devices context as the same hand context based on detecting that the motion data of the first electronic device 100 and the second electronic device 200 is substantially same or similar.

In an embodiment of the disclosure, the first electronic device 100 is configured to determine one of the devices context as the same hand context based on detecting that the motion data of the first electronic device 100 and the second electronic device 200 is same.

In an embodiment of the disclosure, the first electronic device 100 is configured to determine one of the devices context as the different hand context based on detecting that the motion data of the first electronic device 100 and the second electronic device 200 is different.

In an embodiment of the disclosure, the same hand context indicates that the first electronic device 100 and the second electronic device 200 are used by a same hand of a user.

In an embodiment of the disclosure, the different hand context indicates that the first electronic device 100 and the second electronic device 200 are not used by a same hand of a user.

In an embodiment of the disclosure, the devices context is determined by comparing the first input data with the second input data, detecting whether motion data of the first electronic device 100 and the second electronic device 200 is one of similar and different based on a result of the comparison, and determining one of the devices context as the same hand context in response to detecting that the motion data of the first electronic device 100 and the second electronic device 200 is similar, and the devices context as the different hand context in response to detecting that the motion data of the first electronic device 100 and the second electronic device 200 is different.

In an embodiment of the disclosure, similarity between the motion data of the first electronic device 100 and the second electronic device 200 is determined based on motion threshold criteria.

In an embodiment of the disclosure, the motion threshold criteria includes a range having an upper limit and lower limit dynamically determined based on one of the motion data of the first electronic device 100 and the motion data of the second electronic device 200.

In an embodiment of the disclosure, the devices context is determined by comparing the first input data with the second input data, detecting whether a proximity between the first electronic device 100 and the second electronic device 200 is within a proximity threshold criteria based on the comparison, detecting whether motion data of the first electronic device 100 and the second electronic device 200 is one of similar and different based on the comparison in response to determining that the proximity between the first electronic device 100 and the second electronic device 200 is within the threshold criteria, and determining one of the devices context as the same hand context in response to detecting that the motion data of the first electronic device 100 and the second electronic device 200 is similar, and the devices context as the different hand context in response to detecting that the motion data of the first electronic device 100 and the second electronic device 200 is different.

In an embodiment of the disclosure, the proximity threshold criteria includes a range includes an upper limit and lower limit dynamically determined based on one of the input data of the first electronic device 100 and the input data of the second electronic device 200.

In an example, assume that initially the user wears the smart watch on the left hand and the smart phone on the right hand. Further, the user switches the smart phone to the left hand where the user wears the smart watch. After switching the smart phone to the left hand, the smart phone and the smart watch have similar motion as shown in the FIG. 1A.

In an example, assume that initially the user wears the smart watch and holds the smart phone on the same hand (i.e., a left hand). Further, the user switches the smart phone to the right hand and the user wears the smart watch on the left hand. After switching the smart phone to the right hand, the smart phone and the smart watch have different motion as shown in the FIG. 1B.

In an embodiment of the disclosure, the first input data includes motion information of the first electronic device 100. In an embodiment of the disclosure, the first input data includes proximity information of the second electronic device 200. In an embodiment of the disclosure, the first input data includes combination of motion information of the first electronic device 100 and proximity information of the second electronic device 200.

In an embodiment of the disclosure, the second input data includes motion information of the second electronic device 200. In an embodiment of the disclosure, the second input data includes proximity information of the first electronic device 100. In an embodiment of the disclosure, the second input data includes combination of motion information of the second electronic device 200 and proximity information of the first electronic device 100.

In an embodiment of the disclosure, the motion information of the first electronic device 100 and the motion information of the second electronic device 200 are measured at a same time period.

Further, the first electronic device 100 is configured to perform an operation based on the determined devices context. In an embodiment of the disclosure, the operation corresponds to sending a request to regulate a playback rate of a media file on the second electronic device 200. In an embodiment of the disclosure, the operation corresponds to regulating a playback rate of a media file of the first electronic device 100.

In an embodiment of the disclosure, the operation corresponds to send the request to the second electronic device 200 to enable an input over a screen off. In an embodiment of the disclosure, the operation corresponds to enable an input dispatcher over a screen off.

In an embodiment of the disclosure, the operation corresponds to receive, an input at the first electronic device 100 and map the received input to the second electronic device 200.

In an embodiment of the disclosure, the operation corresponds to send a notification received at the first electronic device 100 to the second electronic device 200.

In an embodiment of the disclosure, the operation corresponds to send, by the first electronic device 100, a request to the second electronic device 200 to switch a navigation from an audio mode to a haptic feedback mode.

In an embodiment of the disclosure, the operation corresponds to switch, by the first electronic device 100, a navigation from the audio mode to the haptic feedback mode.

In an embodiment of the disclosure, the operation corresponds to send, by the first electronic device 100, a request to provide access to a private memory at the second electronic device 200.

In an embodiment of the disclosure, the operation corresponds to provide, by the first electronic device 100, an access to a private memory.

In an embodiment of the disclosure, the first electronic device 100 is configured to detect a hand switch event. Further, the first electronic device 100 is configured to update the determined devices context based on the hand switch event. This results in increasing the usability of the first electronic device 100 by removing the previous devices context. In an embodiment of the disclosure, the motion data of the first electronic device 100 and the second electronic device 200 is substantially same determined based on threshold criteria.

In an embodiment of the disclosure, the first electronic device 100 and the second electronic device 200 can communicate with each other. For example, the first electronic device 100 may transmit or receive data to/from the second electronic device 200 via a short-range communication. The short-range communication may be performed in wireless fidelity (Wi-Fi), near field communication (NFC), bluetooth, an infrared ray method, and ZigBee, but is not limited thereto.

In an example, assume that the smart phone and the smart watch are used by the same hand. Therefore, the smart phone in motion detects a movement similar to the smart watch.

In an embodiment of the disclosure, if the smart phone and the smart watch are used by the same hand, then the movements of the smart phone and the smart watch is similar.

In an embodiment of the disclosure, if the smart phone and the smart watch are used by the same hand, the movement of the smart phone is coherent with the movement of the smart watch.

The motion data include the acceleration toward a particular direction which represents the motion of the smart phone or the smart watch.

In an embodiment of the disclosure, the first electronic device 100 compares the first input data and the second input data by calculating a difference between the first motion data and the second motion data.

In an embodiment of the disclosure, the motion coherence between the first electronic device 100 and the second electronic device 200 may be determined by comparing the first motion data and the second motion data. If the difference between the first motion data and the second motion data is within a predetermined threshold, the motion of the first electronic device 100 and the motion the second electronic device 200 is determined to be coherent. In an embodiment of the disclosure, the predetermined threshold may refer to an acceptable tolerance for the difference between the first motion data and the second motion data.

Further, the assignment of the devices context for same or different hand of the operation can be initiated based on comparison of the motion as well as input to any device under following circumstances:

Events based, such as accepting a call, swipe gestures, input to the first and second electronic devices, and Switching of the first electronic device or the second electronic device from one hand to another hand.

Event-Based Context:

In the event-based context, during the occurrence of events, such as tap event over an application icon, the context is tried to setup as detailed in the table below. If the tap event occurs from the hand having the second electronic device 200, this sets up a context which can be used present a different behavior and different user experience. The device would evaluate parameters based on pressure on second electronic device 200/event on the second electronic device 200, time of the tap event on the application icon and use this information to setup the context.

TABLE 1

| Event over the first electronic device 100 | Comparison of events in the first electronic device 100 and second electronic device 200 | Deduction | Context |
| --- | --- | --- | --- |
| Tap over application icon | Tap detected in the second electronic device 200 but motion different from the first electronic device 100 | Input from the second electronic device 100 in different hand | Different hand |
| Receive call | Similar motion | Same hand | Same hand |
| Receive call | Different motion | Different hand | Different hand |

Switching of Device from One Hand to Another:

Based on the comparison of relative motion of the first electronic device 100 and second electronic device 200, the devices context can be determined whether the first electronic device 100 or the second electronic device 200 is being switched between the hands. Whenever there is motion of both first electronic device 100 and second electronic device 200 relative to another, the user allows the first electronic device 100 and the second electronic device 200 to associate context of same or different hands as shown in the below Table 2:

TABLE 2

| Relative motion of the second electronic device 200 with respect to the first electronic device 100 initially | Relative motion of the second electronic device 200 with respect to first electronic device 100 when direction of motion changes | Switching context |
|---|---|---|
| Different motions | Similar motions | Switching to Same Hand |
| Similar motions | Different motions | Switching to Different Hand |

If the user moves both the first electronic device 100 and the second electronic device 200 in different directions initially and then the motion for the first electronic device 100 and the second electronic device 200 is same for a period of time and the motion will associate that the first electronic device 100 and the second electronic device 200 are being switched to the same hand.

In an example, the user may be notified of an incoming text message via a display screen of the wearable device. The incoming text message may be viewed by simply picking up the mobile phone with the hand corresponding to the arm wearing the wearable device, then the display screen of the mobile device automatically displays the incoming message when the difference between the first motion data of the wearable device and the second motion data of the mobile device is within the predetermined threshold.

FIGS. 1A and 1B illustrate the limited overview of the system 1000 but, it is to be understood that other embodiments are not limited thereto. Further, the system 1000 includes any number of hardware or software components communicating with each other. By way of illustration, both an application running on a device and the device itself can be a component.

Figure 2:
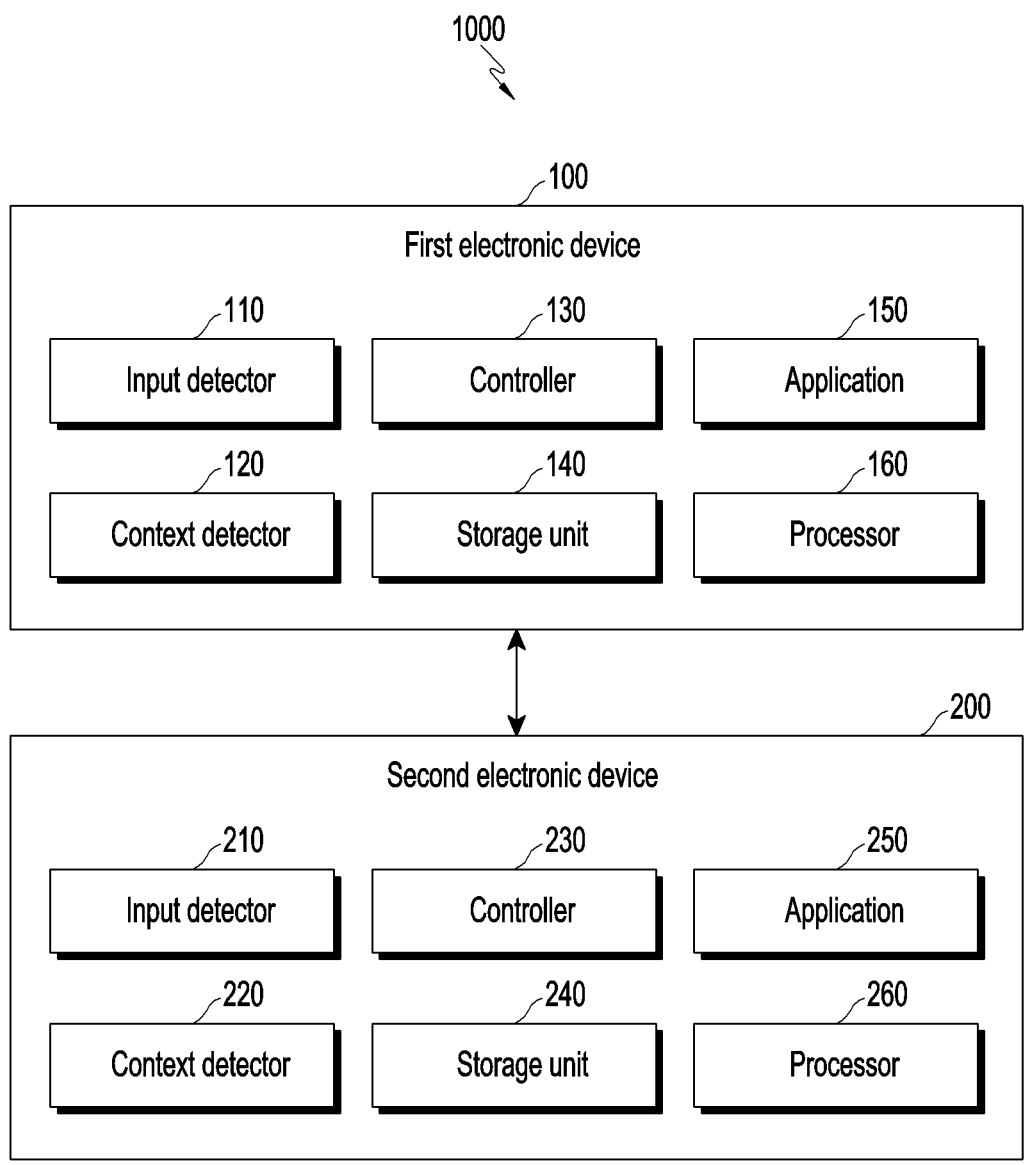
FIG. 2 is a block diagram of various hardware elements of a system for managing an operation based on devices context according to an embodiment of the disclosure.

FIG. 2 is a block diagram of various hardware elements of a system for managing an operation based on devices context according to an embodiment of the disclosure.

Referring to FIG. 2, in an embodiment of the disclosure, the system 1000 includes the first electronic device 100 and the second electronic device 200. In an embodiment of the disclosure, the first electronic device 100 includes an input detector 110, a context detector 120, a controller 130, a storage unit 140, an application 150 and a processor 160. In an embodiment of the disclosure, the second electronic device 200 includes an input detector 210, a context detector 220, a controller 230, a storage unit 240, an application 250, and a processor 260.

The processor 160 is in a communication with the input detector 110, the context detector 120, the controller 130, the storage unit 140, the application 150 and a communication unit (or a transceiver)(not shown). The input detector 110 is configured to detect the first input data and receive the second input data from the second electronic device 200. After receiving the second input data, the context detector 120 is configured to compare the first input data with the second input data. Based on a result of the comparison, the context detector 120 is configured to detect whether motion data of the first electronic device 100 and the second electronic device 200 is one of same hand and different hands. Based on the devices context, the controller 130 is configured to perform the operation.

In an example, the context detector 120 can be, for example but not limited to, a motion sensor and a proximity sensor. The motion sensor is configured to detect a linear movement of the first electronic device moving in a direction. The motion sensor outputs a motion data representing the linear movement and the direction corresponding to the movement. It should be noted that the linear movement is provided for illustration purpose. The embodiment is not intended to limit the direction of the movement. In an embodiment of the disclosure, the motion sensor may be implemented by, but not limited to, a g-sensor, such as an accelerometer or a gyroscope sensor (i.e., a gyro-sensor). For example, a three-axis accelerometer would output an acceleration corresponding to an axis in response to the movement of the first electronic device 100, so that the linear movement of the first electronic device 100 can be obtained.

Further, the motion information of the first electronic device 100 may include values obtained by sensing movement of the first electronic device 100 by using a geomagnetic sensor, a location sensor, an acceleration sensor, a proximity sensor, or a gyroscope sensor, for example, a directionality value, a velocity value, or an acceleration value of the first electronic device 100, but is not limited thereto.

In an embodiment of the disclosure, the context detector 120 is configured to determine one of the devices context as the same hand context based on detecting that the motion data of the first electronic device 100 and the second electronic device 200 is substantially same or similar.

In an embodiment of the disclosure, the context detector 120 is configured to determine one of the devices context as the same hand context based on detecting that the motion data of the first electronic device 100 and the second electronic device 200 is same.

In an embodiment of the disclosure, the context detector 120 is configured to determine one of the devices context as the different hand context based on detecting that the motion data of the first electronic device 100 and the second electronic device 200 is different.

In an embodiment of the disclosure, the same hand context indicates that the first electronic device 100 and the second electronic device 200 are used by a same hand of a user.

In an embodiment of the disclosure, the different hand context indicates that the first electronic device 100 and the second electronic device 200 are not used by the same hand of a user.

Further, the controller 130 retrieves and compares motion of the first electronic device 100 and the second electronic device 200 and the related information stored in the storage unit 140. Further, the based on the devices context, the corresponding information associated with the applications 150 is mapped into corresponding behavior for processing by the controller 130.

The communication unit is configured for communicating internally between internal units and with external devices via one or more networks. The storage unit 140 may include one or more computer-readable storage media. The storage unit 140 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the storage unit 140 may, in some examples, be considered a non-transitory storage medium. The term "non-transitory" may indicate that the storage medium is not embodied in a carrier wave or a propagated signal. However, the term "non-transitory" should not be interpreted that the storage unit 208 is non-movable. In some examples, the storage unit 208 can be configured to store larger amounts of information than a memory. In certain examples, a non-transitory storage medium may store data that can, over time, change (e.g., in a random access memory (RAM) or a cache).

Certain aspects of the disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a read-only memory (ROM), a RAM, compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the disclosure can be easily construed by programmers skilled in the art to which the disclosure pertains.

At this point it should be noted that the various embodiments of the disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the disclosure as described above. Alternatively, one or more processors operating in accordance with stored instructions may implement the functions associated with the various embodiments of the disclosure as described above. If such is the case, it is within the scope of the disclosure that such instructions may be stored on one or more non-transitory processor readable mediums. Examples of the processor readable mediums include a ROM, a RANI, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the disclosure can be easily construed by programmers skilled in the art to which the disclosure pertains.

Further, the operations and functions of the input detector 210, the context detector 220, the controller 230, the storage unit 240 and the processor 260 of the second electronic device 200 are similar to the operations and functions of the input detector 110, the context detector 120, the controller 130, the storage unit 140 and the processor 160 150 of the first electronic device 100.

Although the FIG. 2 shows the hardware elements of the system 1000 but it is to be understood that other embodiments are not limited thereon. In other embodiments of the disclosure, the system 1000 may include less or more number of hardware elements. Further, the labels or names of the hardware elements are used only for illustrative purpose and does not limit the scope of the disclosure. One or more hardware elements may be combined together to perform same or substantially similar function to manage the operation based on the device context.

Figure 3A:
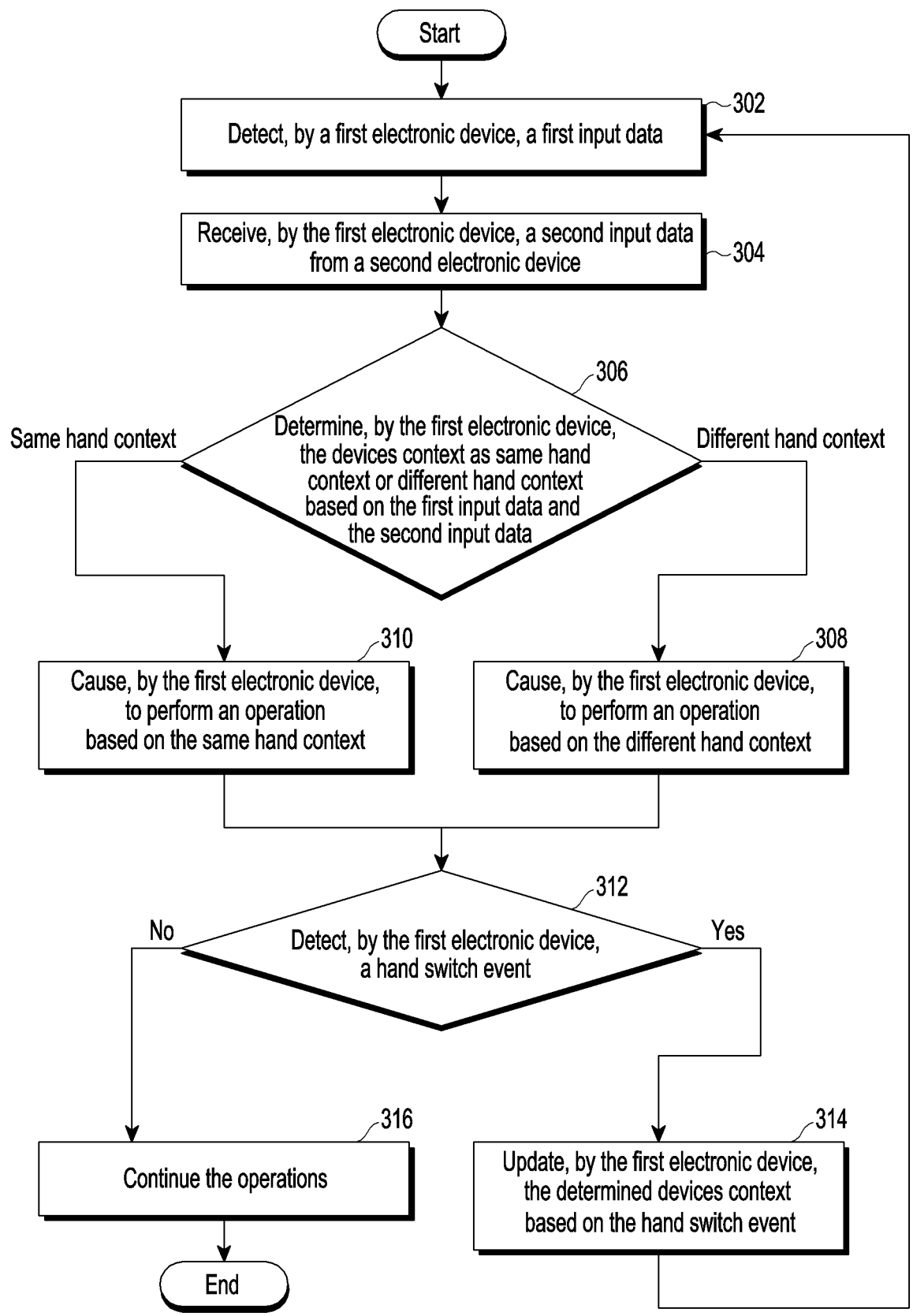
FIG. 3A is a flow diagram illustrating a method for managing an operation based on devices context according to an embodiment of the disclosure.

FIG. 3A is a flow diagram illustrating a method for managing an operation based on devices context according to an embodiment of the disclosure.

Referring to FIG. 3A, at operation 302, the method includes detecting the first input data of the first electronic device 100. In an embodiment of the disclosure, the method allows the input detector 110 to detect the first input data of the first electronic device 100. At operation 304, the method includes receiving the second input data from the second electronic device 200. In an embodiment of the disclosure, the method allows the input detector 110 to receive the second input data from the second electronic device 200.

At operation 306, the method includes determining the devices context as same hand context or different hand context based on the first input data and the second input data. In an embodiment of the disclosure, the method allows the context detector 120 to determine the devices context as same hand context or different hand context based on the first input data and the second input data.

If the devices context is the different hand context then, operation 308, the method includes causing to perform the operation based on the different hand context. In an embodiment of the disclosure, the method allows the controller 130 to perform the operation based on the different hand context.

If the devices context is the same hand context then, operation 310, the method includes causing to perform the operation based on the same hand context. In an embodiment of the disclosure, the method allows the controller 130 to perform the operation based on the same hand context.

At operation 312, the method includes detecting the hand switch event on the first electronic device 100. In an embodiment of the disclosure, the method allows the context detector 120 to detect the hand switch event on the first electronic device 100. If the hand switch event occurs on the first electronic device 100 then, at operation 314, the method includes updating the determined devices context (i.e., a different hand context) based on the hand switch event. In an embodiment of the disclosure, the method allows the context detector 120 to update the determined devices context (i.e., a different hand context) based on the hand switch event. If the hand switch event does not occur on the first electronic device 100 then, at operation 316, the method performs the operation as usual.

The proposed method is executed based on comparison of events and motion for the first electronic device 100 and the second electronic device 200 in the following manner.

Comparison of Motion Event Detected by the Second Electronic Device 200 (e.g., a Smart Watch) as the Tap Gesture Over the Display Screen and Corresponding the Tap Touch Event Over the First Electronic Device 100 (e.g., a Smart Phone) with Same Time Stamps Record if the tap motion event generated on the first electronic device 100 based on motion sensor of the second electronic device 200 with a current time stamp, Record if the tap touch event is generated on the first electronic device 100 based on the display sensors with current time stamp, Compare both events with time stamp and determine if same, Control application launch and contents associated with that application based on above observation, and Store different hand context i.e., both devices are in different hands in current session.

Comparison of Motion Event Detected by the Second Electronic Device 200 (e.g., a Smart Watch) and Corresponding Motion Event Detected Over the First Electronic Device 100 (e.g., a Smart Phone) with Same Time Stamps Record if the motion event above a threshold average motion generated on the smart phone based on motion sensors with current time stamp, Record if the motion event above the threshold average motion generated on the smart watch based on motion sensors with current time stamp, Compare if the events are related, If both events are same, then detect for same hand, If both events are different, then detect for different hand, and Associate same or different hand context for current session and customize user preferences accordingly.

Customize Notifications for Same Hand Context

If notification for the event is generated in either device, determine if both devices in same/different hand, For same hand, notifications to be displayed in one device only, Determine currently active device i.e., either one of the devices with display ON or with current input device, Determine if notification is related to which device, and Direct notification to the active device with an indication if notification related to another device.

Control Application Running in Smart Watch for Call Event:

If the incoming call event is generated in either device, determine if both the smart watch and smart phone are in same hand or different hand, Wait for call being picked by the user, If both devices in same hand, pause any application running in the smart watch, If both devices in different hands, determine if the call is received over smart phone, Determine if the display of the smart watch is off during the call using proximity sensor, If both conditions (d) and (e) are true and the smart watch display is ON, direct input of the smart phone to the smart watch.

The various actions, acts, blocks, operations, or the like in the flow diagram FIG. 3A may be performed in the order presented, in a different order or simultaneously. Further, in some embodiments of the disclosure, some of the actions, acts, blocks, operations, or the like may be omitted, added, modified, skipped, or the like without departing from the scope of the disclosure.

Figure 3B:
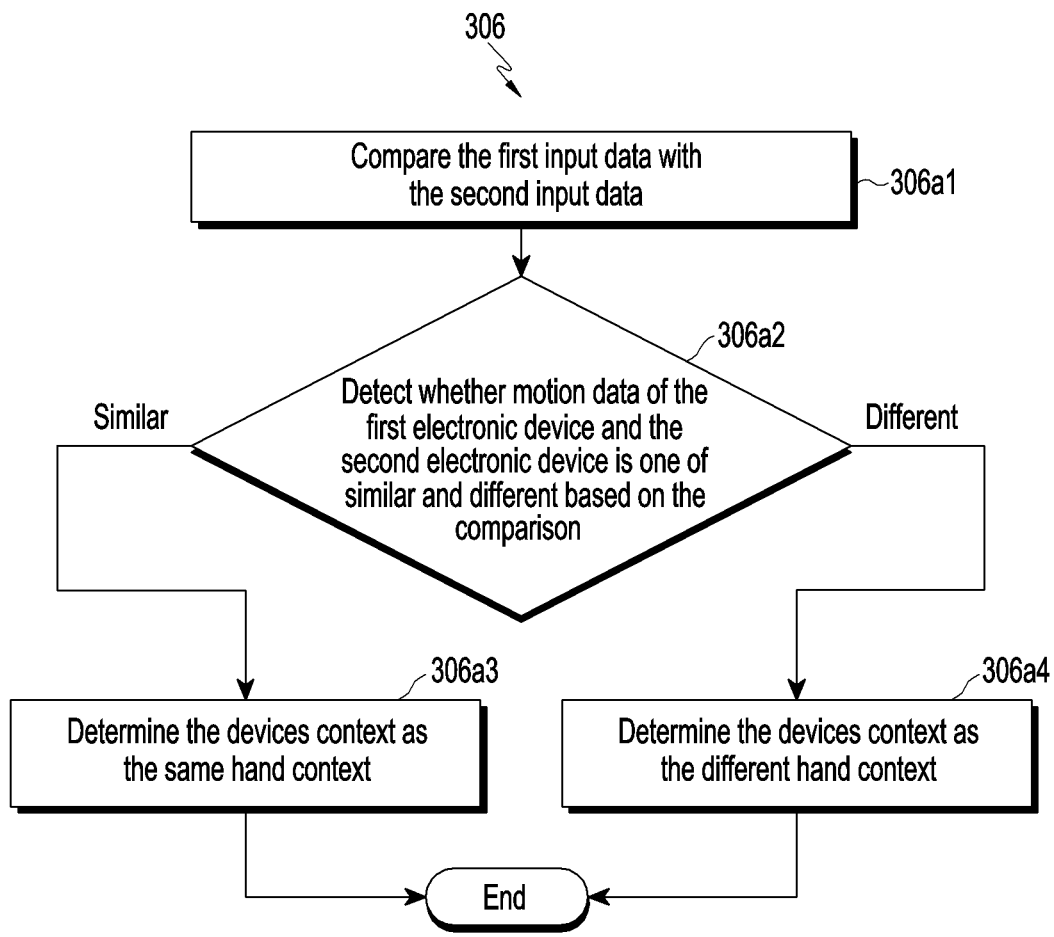
FIG. 3B is a flow diagram illustrating a method for determining devices context based on an input data of a first electronic device and an input data of a second electronic device according to an embodiment of the disclosure.

FIG. 3B is a flow diagram illustrating a method for determining devices context based on an input data of a first electronic device and input data of a second electronic device according to an embodiment of the disclosure.

Referring to FIG. 3B, at operation 306a1, the method includes comparing the first input data with the second input data. In an embodiment of the disclosure, the method allows the context detector 120 to compare the first input data with the second input data. At operation 306a2, the method includes detecting whether motion data of the first electronic device 100 and the second electronic device 200 is one of same and different based on the comparison. In an embodiment of the disclosure, the method allows the context detector 120 to detect whether motion data of the first electronic device 100 and the second electronic device 200 is one of same and different based on a result of the comparison.

If the motion data of the first electronic device 100 and the second electronic device 100 is similar then, at operation 306a3, the method includes determining the devices context as the same hand context. In an embodiment of the disclosure, the method allows the context detector 120 to determine the devices context as the same hand context.

In an embodiment of the disclosure, similarity between the motion data of the first electronic device 100 and the second electronic device 200 is determined based on the motion threshold criteria.

In an embodiment of the disclosure, the motion threshold criteria includes a range comprising the upper limit and the lower limit dynamically determined based on one of the motion data of the first electronic device 100 and the motion data of the second electronic device 200.

If the motion data of the first electronic device 100 and the second electronic device 100 is different then, at operation 306a4, the method includes determining the devices context as the different hand context. In an embodiment of the disclosure, the method allows the context detector 120 to determine the devices context as the different hand context in response to detecting that the motion data of the first electronic device and the second electronic device is different.

The various actions, acts, blocks, operations, or the like in the flow diagram 306 may be performed in the order presented, in a different order or simultaneously. Further, in some embodiments of the disclosure, some of the actions, acts, blocks, operations, or the like may be omitted, added, modified, skipped, or the like without departing from the scope of the disclosure.

Figure 3C:
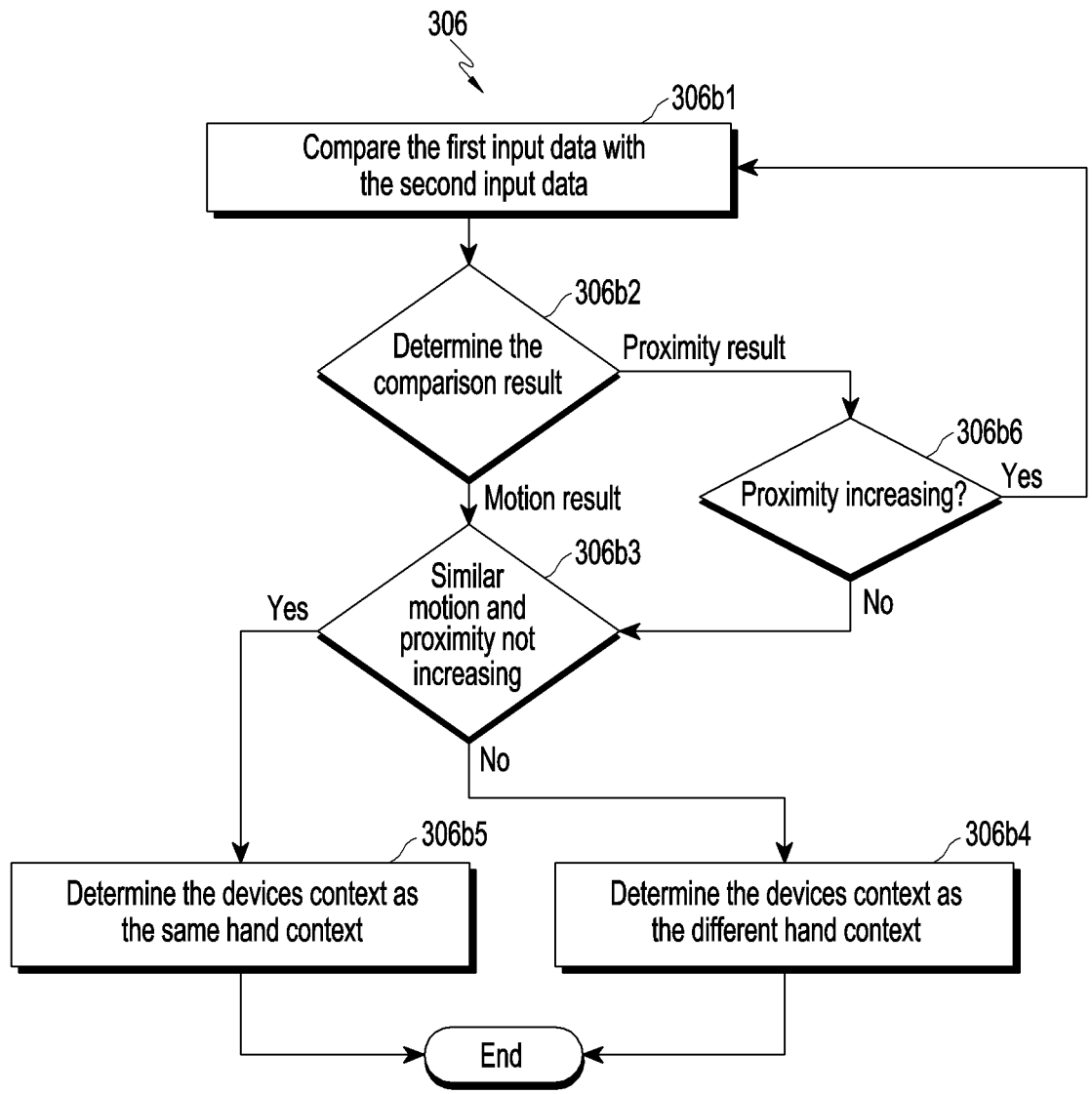
FIG. 3C is a flow diagram illustrating a method for determining devices context based on proximity and motion comparison according to an embodiment of the disclosure.

FIG. 3C is a flow diagram illustrating a method for determining devices context based on proximity and motion comparison according to an embodiment of the disclosure.

Referring to FIG. 3C, at operation 306b1, the method includes comparing the first input data with the second input data. In an embodiment of the disclosure, the method allows the context detector 120 to compare the first input data with the second input data. At operation 306b2, the method includes determining the comparison result corresponding to the motion or proximity. In an embodiment of the disclosure, the method allows the context detector 120 to determine the comparison result corresponding to the motion or proximity.

If the comparison result corresponding to the motion then, at operation 306b3, the method includes determining the similar motion between the first electronic device 100 and the second electronic device 200 and proximity not increasing between the first electronic device 100 and the second electronic device 200. In an embodiment of the disclosure, the method allows the context detector 120 to determine the similar motion between the first electronic device 100 and the second electronic device 200 and proximity not increasing between the first electronic device 100 and the second electronic device 200.

If the similar motion is not occurred between the first electronic device 100 and the second electronic device 200 and proximity increasing between the first electronic device 100 and the second electronic device 200 then, at operation 306b4, the method includes performing the operation with different hand context. If the similar motion is occurred between the first electronic device 100 and the second electronic device 200 and proximity not increasing between the first electronic device 100 and the second electronic device 200 then, at operation 306b5, the method includes performing the operation with same hand context.

At operation 306b6, the method includes determining whether the proximity between the first electronic device 100 and the second electronic device 200 is increasing. If the proximity between the first electronic device 100 and the second electronic device 200 is increasing then, at operation 306b1, the method includes comparing the first input data with the second input data. If the proximity between the first electronic device 100 and the second electronic device 200 is not increasing then, the method performs the operation 306b3.

In an embodiment of the disclosure, the proximity between the first electronic device 100 and the second electronic device 200 is determined based on the proximity threshold criteria.

In an embodiment of the disclosure, the proximity threshold criteria includes a range includes the upper limit and the lower limit dynamically determined based on one of the input data of the first electronic device 100 and the input data of the second electronic device 200.

The various actions, acts, blocks, operations, or the like in the flow diagram 306 may be performed in the order presented, in a different order or simultaneously. Further, in some embodiments of the disclosure, some of the actions, acts, blocks, operations, or the like may be omitted, added, modified, skipped, or the like without departing from the scope of the disclosure.

Figure 4:
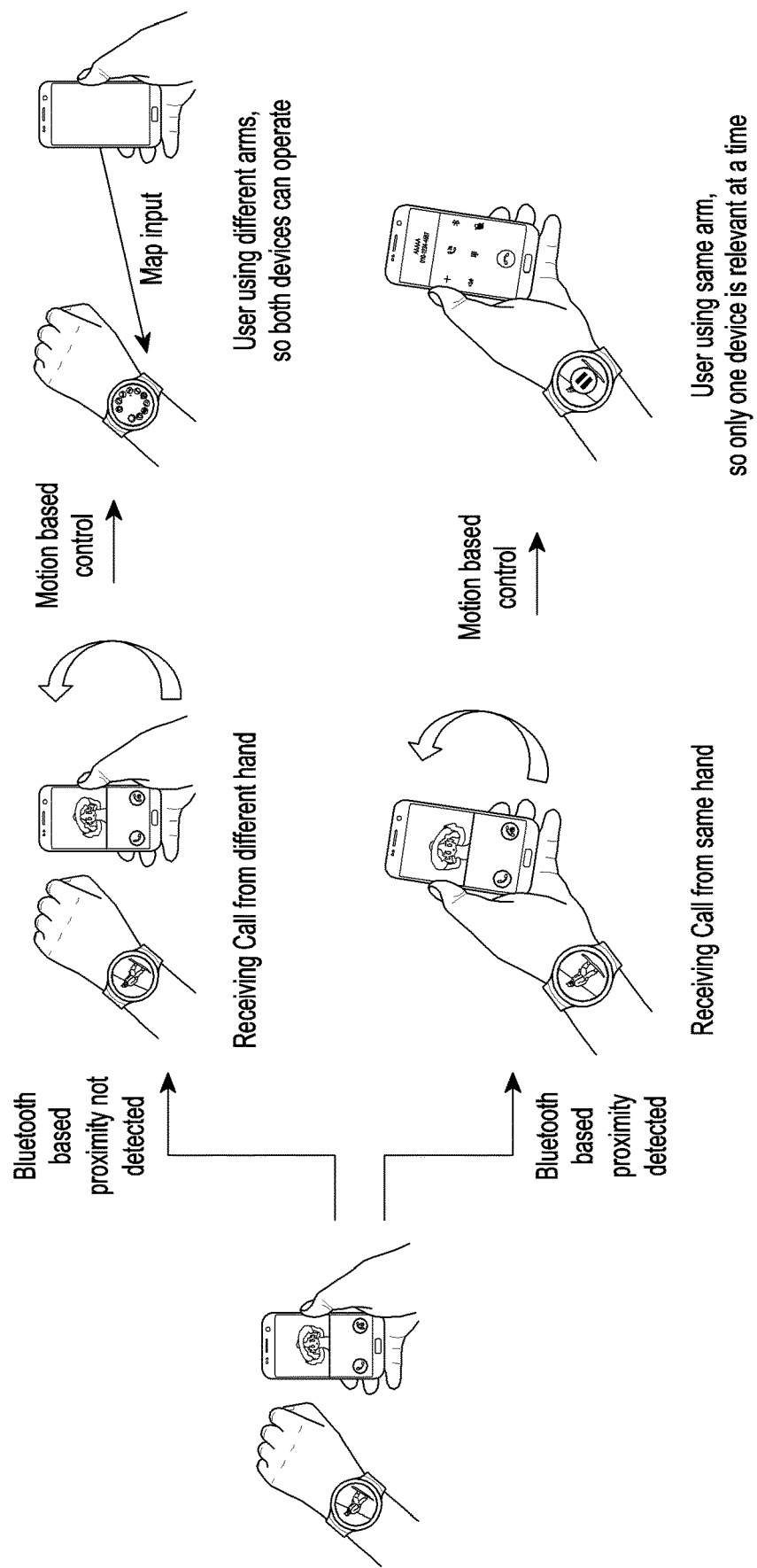
FIG. 4 illustrates an operation being performed based on devices context according to an embodiment of the disclosure.

FIG. 4 illustrates an operation being managed based on devices context according to an embodiment of the disclosure.

Referring to FIG. 4, assume that the smart watch is used by the left hand of the user and the smart phone is used by the right hand of the user. If the Bluetooth based proximity is not detected then the smart phone can map the input to the smart watch by using the motion-based control. If the Bluetooth based proximity is detected and the smart watch and the smart phone are used by the same hand (e.g., a right hand) of the user, then only one operation (e.g., an incoming call) on the first electronic device (e.g., a smart phone) is relevant at a time by using the motion-based control.

Figure 5:
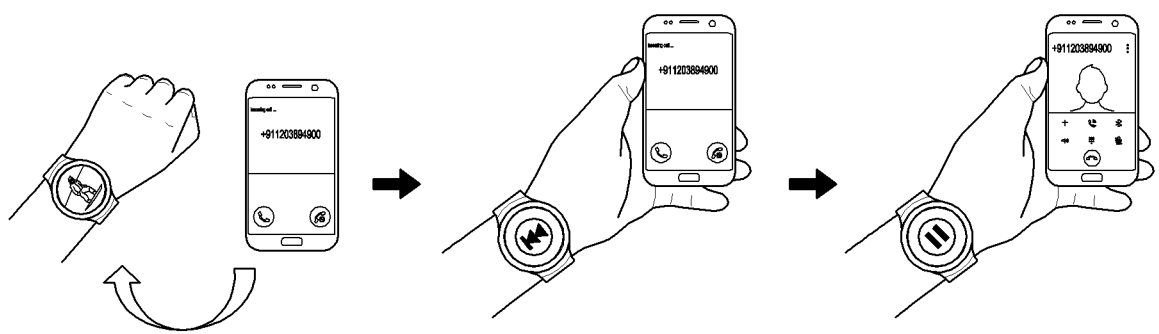
FIG. 5 illustrates a first electronic device sending a request to regulate a playback rate of a media file played on a second electronic device, when a first electronic device receives an incoming call, and a first electronic device and the second electronic device being used by a same hand of a user, according to an embodiment of the disclosure.

FIG. 5 illustrates a first electronic device sending a request to regulate a playback rate of a media file played on a second electronic device, when a first electronic device receives an incoming call, and a first electronic device and a second electronic device are used by a same hand of a user, according to an embodiment of the disclosure.

Referring to FIG. 5, the smart watch and the smart phone are used by different hands of the user (i.e., the smart watch is used by the left hand of the user whereas the smart phone is used by right hand of the user). The user receives the event (e.g., an incoming call) over the smart phone while there is a music application running in the smart watch). If the user wishes to switch the hand to receive the call from same hand as the smart watch is worn by the user, then the controller 130 compares the motion data of the smart watch and the smart phone. If the motion data of the smart watch and the smart phone is similar or same or substantially same or the motion data of the smart watch and the smart phone is within the threshold value then, the music application running over the smart watch is paused as the user will not be able to view the application on the smart watch.

Figure 6:
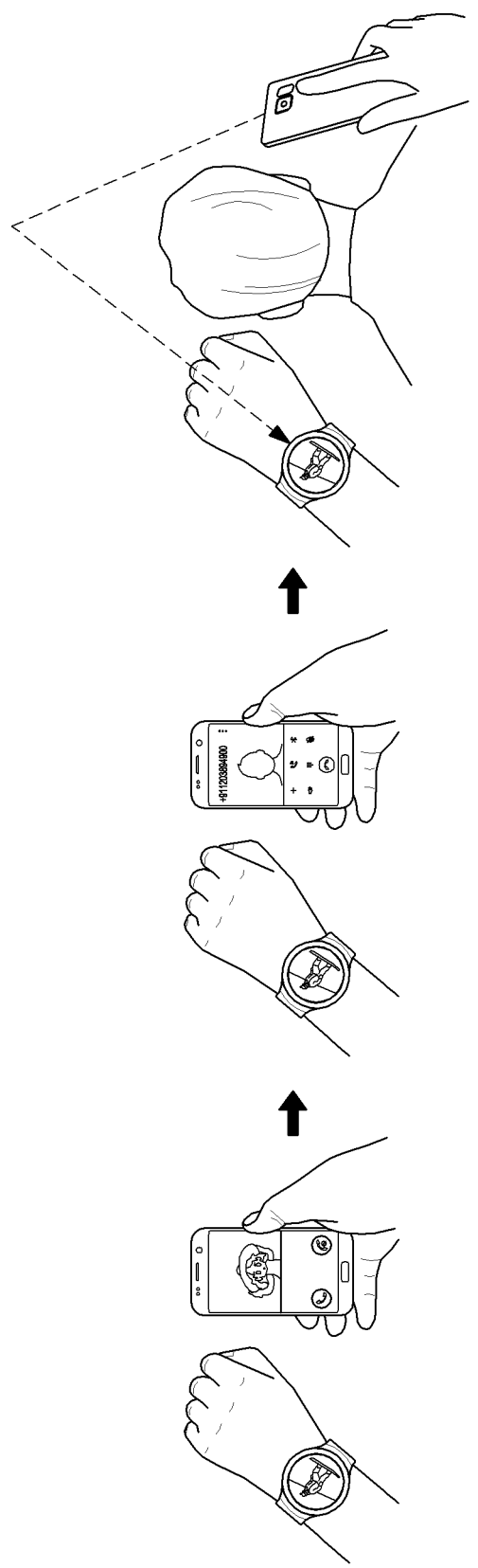
FIG. 6 illustrates a first electronic device sending a request to regulate a playback rate of a media file played on a second electronic device, when the first electronic device receives an incoming call and the first electronic device and the second electronic device being used by different hands of a user, according to an embodiment of the disclosure.

FIG. 6 illustrates a first electronic device sending a request to regulate a playback rate of a media file played on a second electronic device, when a first electronic device receives an incoming call and a first electronic device and a second electronic device are used by different hands of a user, according to an embodiment of the disclosure.

Referring to FIG. 6, the smart watch and the smart phone are used by different hands of the user (i.e., the smart watch is used by the left hand of the user whereas the smart phone is used by right hand of the user). If the user receives the event (e.g., an incoming call), over the smart phone while there is the music application running in the smart watch at a same time. If the user wishes to attend the call from same hand (i.e., a right hand), then the music application running is controlled based on a mapping input defined by the user as the motion data of the smart watch and the smart phone is similar.

Figure 7:
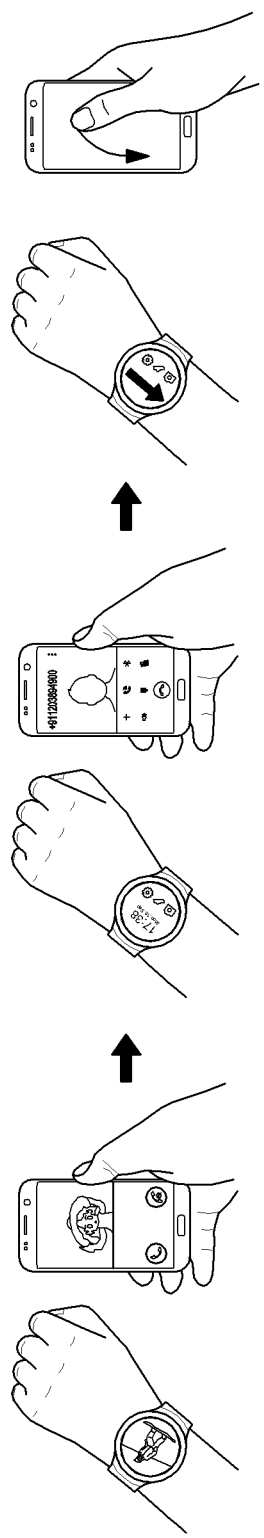
FIG. 7 illustrates a mobile phone sending a request to a second electronic device to enable an input over a screen off, when a first electronic device receiving an incoming call and the first electronic device and the second electronic device being used by different hands of a user, according to an embodiment of the disclosure.

FIG. 7 illustrates a first electronic device sending a request to a second electronic device to enable an input over a screen off, when a first electronic device receives an incoming call and a first electronic device and a second electronic device are used by different hands of a user, according to an embodiment of the disclosure.

Referring to FIG. 7, the smart watch and the smart phone are used by different hands of the user (i.e., the smart watch is used by the left hand of the user and the smart phone is used by right hand of the user), and the user receives the incoming call on the smart phone. Further, the display screen of the smart phone is OFF during the call, then the user cannot operate with the display screen of the smart phone, so that the input over smart phone can be mapped to the corresponding gesture over the smart watch if the smart watch screen is ON.

In an example, assume that the smart watch is used by the left hand of the user and the smart phone is used by the right hand of the user and the display screen of the smart watch is off. If the user receives the incoming call over the smart phone while there is the application 250 running in the smart watch, then the user can navigate through the smart watch by providing input to the smart phone using a proximity sensor during the call. Further, a navigation panel/an input mechanism may be provided on the smart phone, either at the back to be used with index finger or at a front portion on the display screen to be used with thumb.

Figure 8:
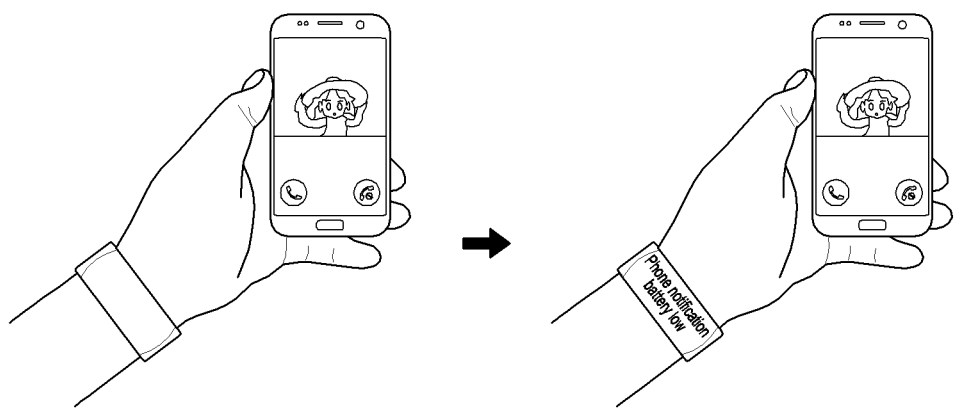
FIG. 8 illustrates a first electronic sending a notification to a second electronic device, when the first electronic device is an ongoing call, and the first electronic device and the second electronic device being used by a same hand of a user, according to an embodiment of the disclosure.

FIG. 8 illustrates a first electronic device sending a notification to a second electronic device, when a first electronic device is an ongoing call, and a first electronic device and a second electronic device are used by a same hand of a user, according to an embodiment of the disclosure.

Referring to FIG. 8, when the first electronic device 100 and the second electronic device 200 are used by the same hand of the user, then the notifications can be prioritized to the any one of the electronic devices 100 or 200, so that the user doesn't has to switch between the first electronic device 100 and the second electronic device 200 for any the event. Based on the priority, all notification will be pushed to that specific device only.

In an example, assume that the smart watch and the smart phone are used by the same hand of the user, and the user is interacting with the smart watch. If the user receives the notification related to the smart phone then the notification is displayed on the smart watch instead of the smart phone as the user is interacting with the smart watch, so that the user doesn't have to switch frequently between the smart watch and the smart phone as shown in the FIG. 8.

Figure 9:
FIG. 9 illustrates a first electronic device sending a request to a second electronic device to switch a navigation from an audio mode to a haptic feedback mode, when the first electronic device receives an incoming call and the first electronic device and the second electronic device being used by different hands of a user, according to an embodiment of the disclosure.

FIG. 9 illustrates a first electronic device sending a request to a second electronic device to switch a navigation from an audio mode to a haptic feedback mode, when a first electronic device receives an incoming call, and a first electronic device and a second electronic device are used by different hands of a user, according to an embodiment of the disclosure.

Referring to FIG. 9, the smart watch is used by the left hand of the user and the smart phone is used by the right hand of the user. If the user of the smart phone receives the incoming call while using the navigation application on the smart watch then, it will be difficult for the user to provide the input to the smart watch from other arm holding the smart phone for the incoming call. The input mechanism for the smart watch can be changed to the gesture mode. Based on movements of the gestures, the input can be provided to the smart watch.

Figure 10:
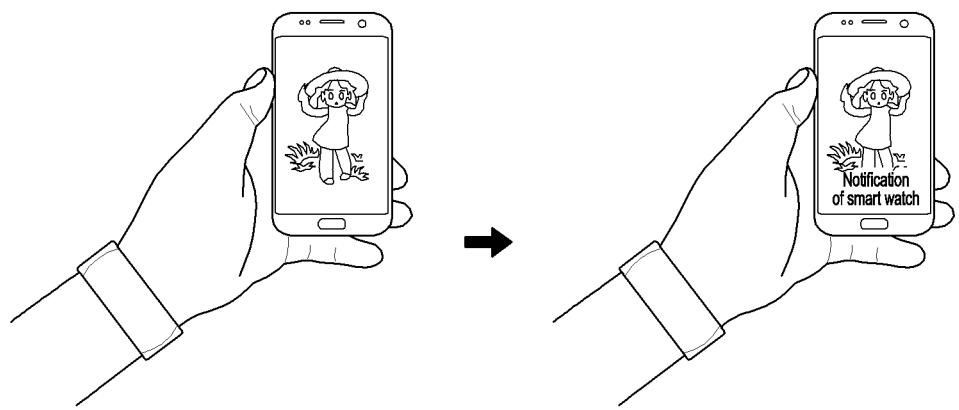
FIG. 10 illustrates a first electronic device receiving a notification from a second electronic device, when a display screen of the first electronic device is in an active mode, a display screen of the second electronic device is in an inactive mode, and the first electronic device and the second electronic device are used by a same hand of a user, according to an embodiment of the disclosure.

FIG. 10 illustrates a first electronic device receives a notification from a second electronic device, when a display screen of a first electronic device is in an active mode, a display screen of a second electronic device is in an inactive mode, and a first electronic device and a second electronic device are used by a same hand of a user, according to an embodiment of the disclosure.

Referring to FIG. 10, the user is interacting with the smart phone, and the smart watch and the smart phone are used by a same hand of the user. If the user receives the notification related to the smart watch then the notification is displayed on the smart phone as the user is interacting with the smart phone and the motion data of the smart watch and the smart phone is similar, so that the user doesn't have to switch frequently between the smart watch and the smart phone.

Figure 11:
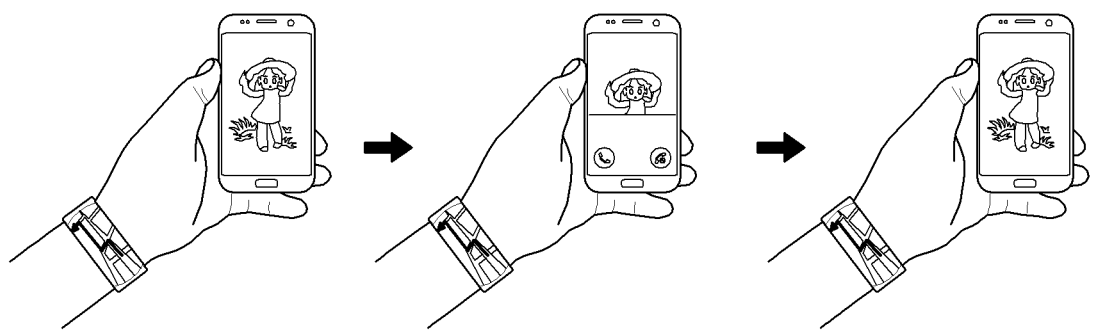
FIG. 11 illustrates a first electronic device sending a request to a second electronic device to switch a navigation from an audio mode to a haptic feedback mode, when the first electronic device receives an incoming call, and the first electronic device and the second electronic device are used by a same hand of a user, according to an embodiment of the disclosure.

FIG. 11 illustrates a first electronic device sending a request to a second electronic device to switch a navigation from an audio mode to a haptic feedback mode, when a first electronic device receives an incoming call, and a first electronic device and a second electronic device are used by a same hand of a user, according to an embodiment of the disclosure.

Referring to FIG. 11, consider the smart watch and the smart phone is used by a same hand of the user. If the user receives the incoming call on the smart phone while using the navigation application in an audio mode on the smart watch then the only one device (i.e., a smart watch or a smart phone) can be used at a time in this scenario, so navigation will be switched from the audio mode to a haptic feedback mode to avoid interference with the call audio as the motion data of the smart watch and the smart phone is similar.

Figure 12:
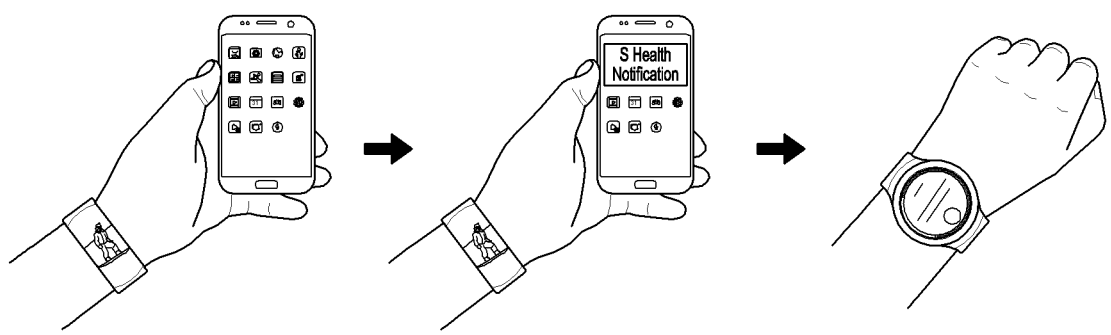
FIG. 12 illustrates a second electronic device displaying a notification after a hand switch event according to an embodiment of the disclosure.

FIG. 12 illustrates a second electronic device displaying a notification after a hand switch event, according to an embodiment of the disclosure.

Referring to FIG. 12, all notification events are prioritized on the smart phone to minimize switching between the smart phone and the smart watch. If the user switches the smart phone to the other arm from the arm in which user wears the smart watch then the application corresponding to the notification will open on the smart watch within a threshold time based on a proximity based prioritizing event technique.

Figure 13:
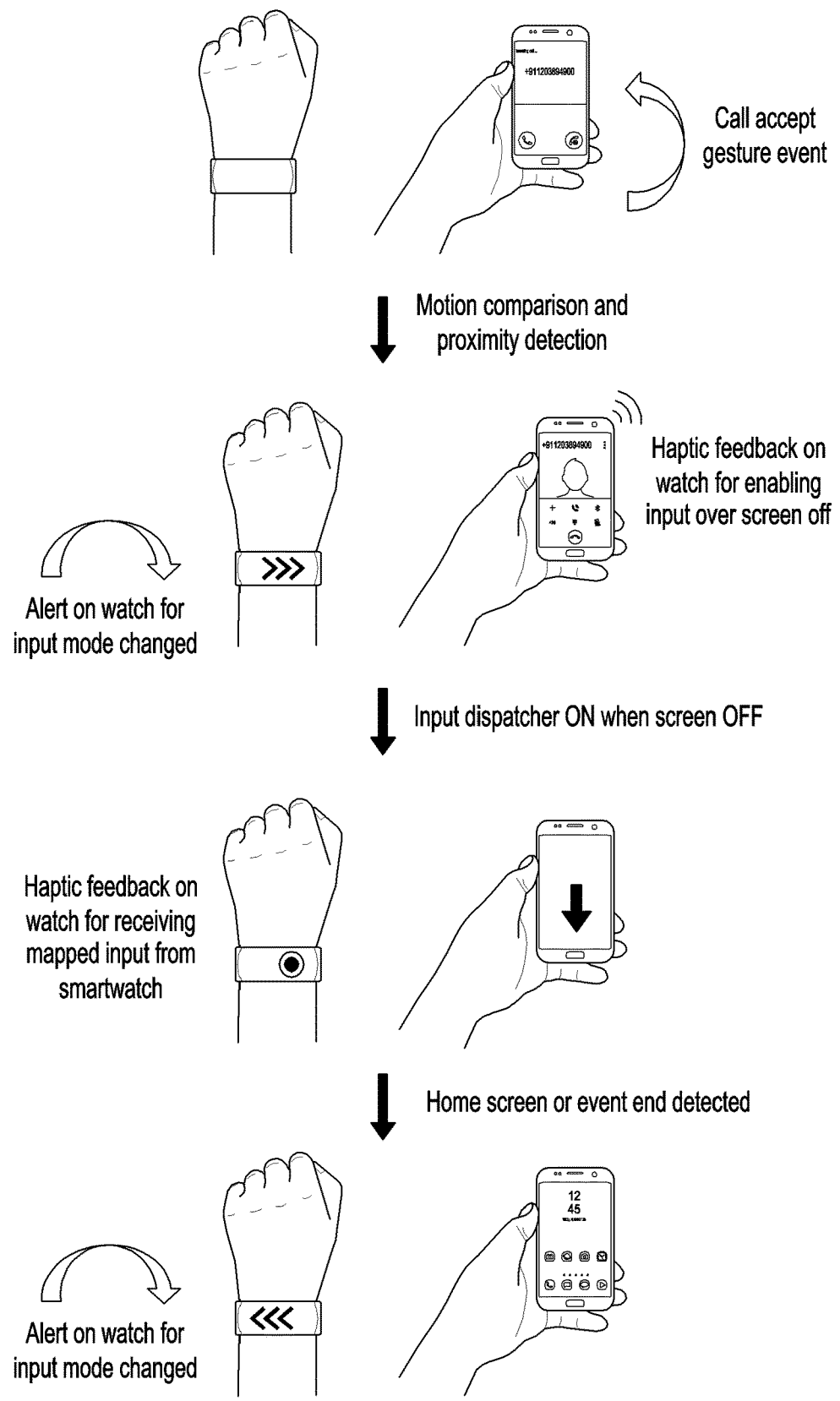
FIG. 13 illustrates a first electronic device sending a request to a second electronic device to enable an input over screen off, when the first electronic device receives an incoming call, and the first electronic device and the second electronic device are used by different hands of the user, according to an embodiment of the disclosure.

FIG. 13 illustrates a first electronic device sending a request to a second electronic device to enable an input over a screen off, when a first electronic device receives an incoming call, and a first electronic device and a second electronic device are used by different hands of a user, according to an embodiment of the disclosure.

Referring to FIG. 13, the call accept gesture event is detected on the smart phone. After performing the call accept gesture event, the smart phone and the smart watch initiates the motion comparison and proximity detection. Based on the motion comparison and proximity detection, the smart phone determines the different hand context. Based on the different hand context, the smart phone provides the haptic feedback on the smart watch for enabling the input over the display screen off, and the smart watch receives the alert for input mode changed. Further, if the input dispatcher is ON when the display screen of the smart phone is OFF, then the haptic feedback is provided on the smart watch for receiving the mapped input. Once the display screen of the smart phone is ON, the smart watch receives the alert for the input mode changed.

Figure 14:
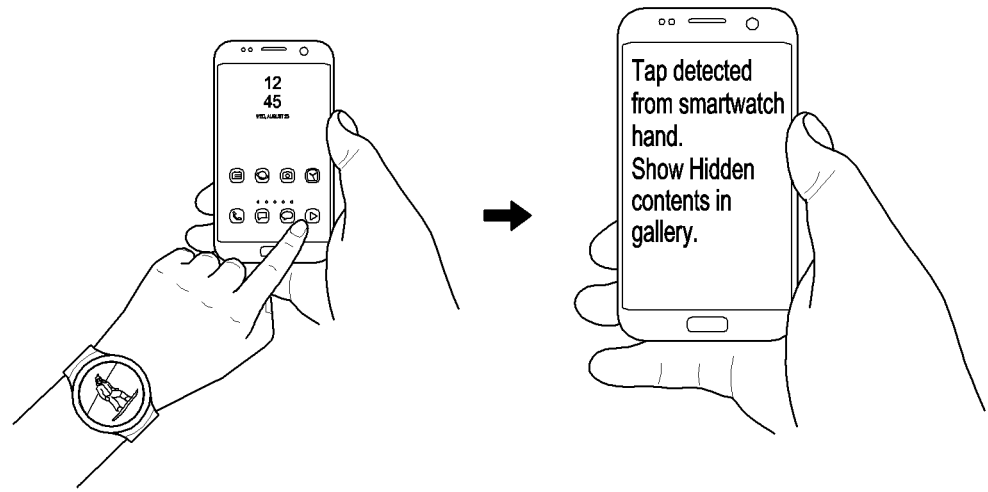
FIG. 14 illustrates a first electronic device sending a request to provide access to a private memory at a second electronic device, when the first electronic device and the second electronic device are used by different hands of the user, according to an embodiment of the disclosure.

FIG. 14 illustrates a first electronic device sending a request to provide access to a private memory at a second electronic device, when a first electronic device and a second electronic device are used by different hands of a user, according to an embodiment of the disclosure.

Referring to FIG. 14, the tap event is detected over an application icon in the smart phone, a time generated event is compared between the smart phone tap and the motion detected in the smart watch. If both events are similar, then the smart phone can be deduced that the tap has been performed from the smart watch hand. Hence, based on this context, if the application to be opened contains hidden contents, then those contents will be visible to the user.

Figure 15:
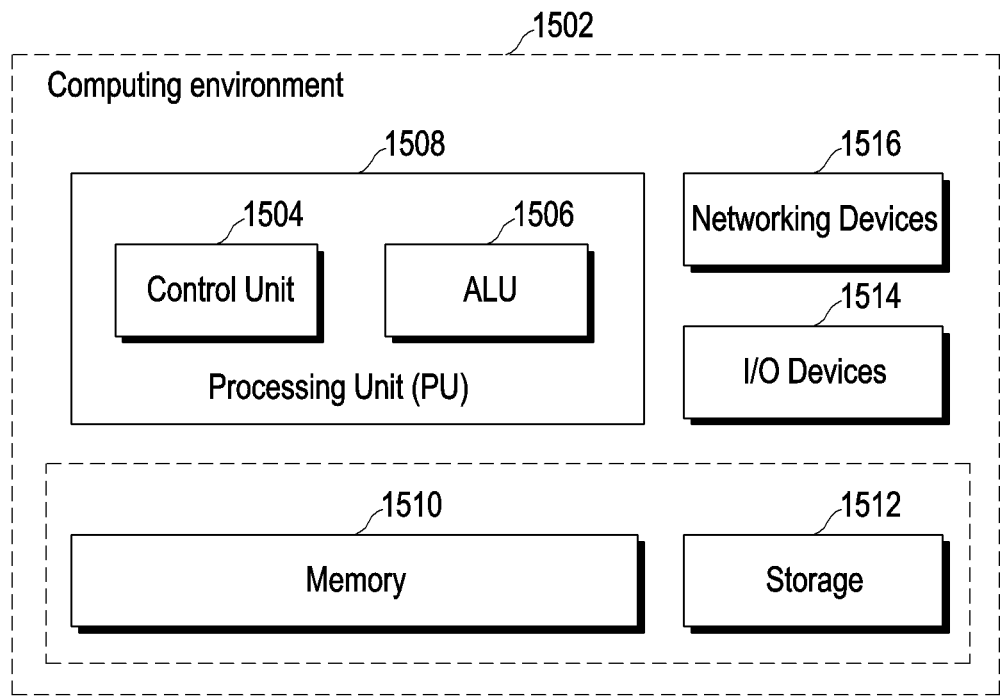
FIG. 15 illustrates a computing environment implementing a method for managing an operation based on devices context according to an embodiment of the disclosure.

FIG. 15 illustrates a computing environment implementing method for managing an operation based on a devices context according to an embodiment of the disclosure.

Referring to FIG. 15, a computing environment 1502 comprises at least one processing unit 1508 that is equipped with a control unit 1504, an arithmetic logic unit (ALU) 1506, a memory unit 1510, a storage unit 1512, a plurality of networking devices 1516 and a plurality of input output (I/O) devices 1514. The processing unit 1508 is responsible for processing the instructions of the technique. The processing unit 1508 receives commands from the control unit 1504 in order to perform its processing. Further, any logical and arithmetic operations involved in the execution of the instructions are computed with the help of the ALU 1506.

The overall computing environment 1502 can be composed of multiple homogeneous or heterogeneous cores, multiple CPUs of different kinds, special media and other accelerators. The processing unit 1508 is responsible for processing the instructions of the technique. Further, the CPUs may be located on a single chip or over multiple chips.

The technique comprising of instructions and codes required for the implementation are stored in either the memory unit 1510 or the storage unit 1512 or both. At the time of execution, the instructions may be fetched from the corresponding memory unit 1510 or storage unit 1512, and executed by the processing unit 1508.

In case of any hardware implementations various networking devices 1516 or external I/O devices 1514 may be connected to the computing environment 1502 to support the implementation through the networking unit and the I/O device unit.

The embodiments disclosed herein can be implemented through at least one software program running on at least one hardware device and performing network management functions to control the elements. The elements shown in the FIGS. 1A to 15 include blocks, elements, actions, acts, operations, or the like which can be at least one of a hardware device, or a combination of hardware device and software module.

While the disclosure has been shown and described with reference to various embodiments thereof, it will be understood that various changes in form and details may be made therein without departing from the spirit and scope of the disclosure as defined by the appended claims and their equivalents.

What is claimed is:

1. A method for performing at least one operation based on a devices context by a first electronic device, the method comprising:

detecting a first data including first motion information inputted to the first electronic device and first proximity information of a second electronic device;

receiving a second data including second motion information inputted to the second electronic device and second proximity information of the first electronic device from the second electronic device;

identifying a similarity between the first motion information and the second motion information, and proximity between the first electronic device and the second electronic device based on the first proximity information and the second proximity information;

determining a devices context based on the similarity and the proximity; and performing the at least one operation based on the determined devices context, wherein the devices context comprises one of:
- a same hand context indicating that the first electronic device and the second electronic device are used by a same hand of a user, or
- a different hand context indicating that the first electronic device and the second electronic device are used by a different hand of the user.

2. The method of claim 1, further comprising:

identifying, by the first electronic device, a hand switch event indicating that the first electronic device or the second electronic device has been switched from one hand of the user to another hand of the user; and updating, by the first electronic device, the determined devices context based on the hand switch event.

3. The method of claim 1, wherein the identifying of the similarity between the first motion information and the second motion information comprises:

comparing the first motion information and the second motion information; and identifying whether the first motion information and the second motion information are one of similar or different based on a result of the comparison.

4. The method of claim 3, wherein the similarity between the first motion information and the second motion information is determined based on motion threshold criteria, and wherein the motion threshold criteria comprises a range comprising an upper limit and a lower limit determined based on one of the first motion information or the second motion information.

5. The method of claim 1, wherein the identifying of the proximity between the first electronic device and the second electronic device comprises:

comparing the first proximity information with the second proximity information; and identifying whether the proximity between the first electronic device and the second electronic device is within proximity threshold criteria based on a result of the comparison.

6. The method of claim 5, wherein the proximity threshold criteria comprises a range comprising an upper limit and a lower limit determined based on one of the first proximity information or the second proximity information.

7. The method of claim 5, wherein the proximity is identified based on a bluetooth or bluetooth low energy (BLE) proximity comparison.

8. The method of claim 1, wherein the determining of the devices context based on the similarity and the proximity comprises:

determining the devices context as one of the same hand context in response to identifying that the first motion information and the second motion information are similar and identifying that the first electronic device and the second electronic device are within a proximity threshold criteria, or the different hand context in response to identifying that the first motion information and the second motion information are different and identifying that the first electronic device and the second electronic device are not within the proximity threshold criteria.

9. The method of claim 1, wherein the first data is detected and the second data is received when an event is detected at the first electronic device.

10. The method of claim 1, wherein the at least one operation includes a motion based operation comprising at least one of:

transmitting, by the first electronic device, a request to regulate a playback rate of a first media file to the second electronic device, regulating a playback rate of a second media file to the first electronic device, transmitting a request to the second electronic device to enable an input over screen off, enabling, by the first electronic device, an input dispatcher over a screen off, receiving an input at the first electronic device and mapping the received input to the second electronic device, transmitting a notification received at the first electronic device to the second electronic device, transmitting a request to the second electronic device to switch a navigation from an audio mode to a haptic feedback mode, switching the navigation from the audio mode to the haptic feedback mode, transmitting a request to provide access to a private memory at the second electronic device, or providing an access to a private memory.

11. The method of claim 1, wherein the first motion information and the second motion information are measured at a same time period.

12. The method of claim 1, further comprising defining a priority of the first electronic device and the second electronic device based on which of a display of the first electronic device or the second electronic device is currently relevant to the user.

13. The method of claim 1, further comprising defining priorities of events based on a current devices context of the first electronic device and the second electronic device.

14. The method of claim 13, wherein the priorities of the events are determined further based on determining a display unit of the first electronic device or the second electronic device best suitable for the user.

15. A first electronic device comprising:

a transceiver; and at least one processor coupled to the transceiver, wherein the at least one processor is configured to:

detect a first data including first motion information inputted to the first electronic device and first proximity information of a second electronic device, receive a second data including second motion information inputted to the second electronic device and second proximity information of the first electronic device from the second electronic device, identify a similarity between the first motion information and the second motion information, and proximity between the first electronic device and the second electronic device based on the first proximity information and the second proximity information, determine a devices context based on the similarity and the proximity, and perform at least one operation based on the determined devices context, wherein the devices context comprises one of:
a same hand context indicating that the first electronic device and the second electronic device are used by a same hand of a user, or
a different hand context indicating that the first electronic device and the second electronic device are used by different hands of the user, and
wherein the at least one operation comprises one of a first operation based on the devices context being the same hand context or a second operation based on the devices context being the different hand context.

16. The first electronic device of claim 15, wherein the at least one processor is further configured to:
identify a hand switch event indicating that the first electronic device or the second electronic device has been switched from one hand of the user to another hand of the user, and
update the determined devices context based on the hand switch event.

17. The first electronic device of claim 15, wherein the at least one processor is further configured to:
compare the first motion information and the second motion information; and
identify whether the first motion information and the second motion information are one of similar or different based on a result of the comparison.

18. The first electronic device of claim 17,
wherein the similarity between the first motion information and the second motion information is determined based on motion threshold criteria, and
wherein the motion threshold criteria comprises a range comprising an upper limit and a lower limit determined based on one of the first motion information or the second motion information.

19. The first electronic device of claim 15, wherein the at least one processor is further configured to:
compare the first proximity information with the second proximity information; and
identify whether the proximity between the first electronic device and the second electronic device is within proximity threshold criteria based on a result of the comparison.

20. The first electronic device of claim 19,
wherein the at least one processor is further configured to determine the devices context as one of the same hand context in response to identifying that the first motion information and the second motion information are similar and identifying that the first electronic device and the second electronic device are within a proximity threshold criteria, or
the different hand context in response to identifying that the first motion information and the second motion information are different and identifying that the first electronic device and the second electronic device are not within the proximity threshold criteria.

21. The first electronic device of claim 19,
wherein the proximity threshold criteria comprises a range comprising an upper limit and a lower limit determined based on one of the first proximity information or the second proximity information.

22. The first electronic device of claim 15, wherein the first data is detected and the second data is received when an event is detected at the first electronic device.

23. The first electronic device of claim 15, wherein the at least one operation is a motion based operation comprising at least one of:
transmitting, by the first electronic device a request to regulate a playback rate of a first media file to the second electronic device,
regulating a playback rate of a second media file to the first electronic device,
transmitting a request to the second electronic device to enable an input over screen off,
enabling an input dispatcher over a screen off,
receiving an input at the first electronic device and mapping the received input to the second electronic device,
transmitting a notification received at the first electronic device to the second electronic device,
transmitting a request to the second electronic device to switch a navigation from an audio mode to a haptic feedback mode,
switching the navigation from the audio mode to the haptic feedback mode,
transmitting a request to provide access to a private memory at the second electronic device, or
providing an access to a private memory.

24. The first electronic device of claim 15,
wherein the first motion information and
the second motion information are measured at a same time period.

25. The method of claim 5, further comprising:
identifying whether the proximity between the first electronic device and the second electronic device is increasing;
determining the devices context as the same hand context based on identifying that the first motion information and the second motion information are similar and the proximity is not increasing;
determining the devices context as the different hand context based on identifying that the first motion information and the second motion information are different and the proximity is not increasing; and
re-comparing the first data with the second data based on the proximity increasing.

* * * * *